J. J. TREFZ.
BOLTING REEL.
APPLICATION FILED NOV. 3, 1916.
1,302,456.
Patented Apr. 29, 1919.
2 SHEETS—SHEET 1.
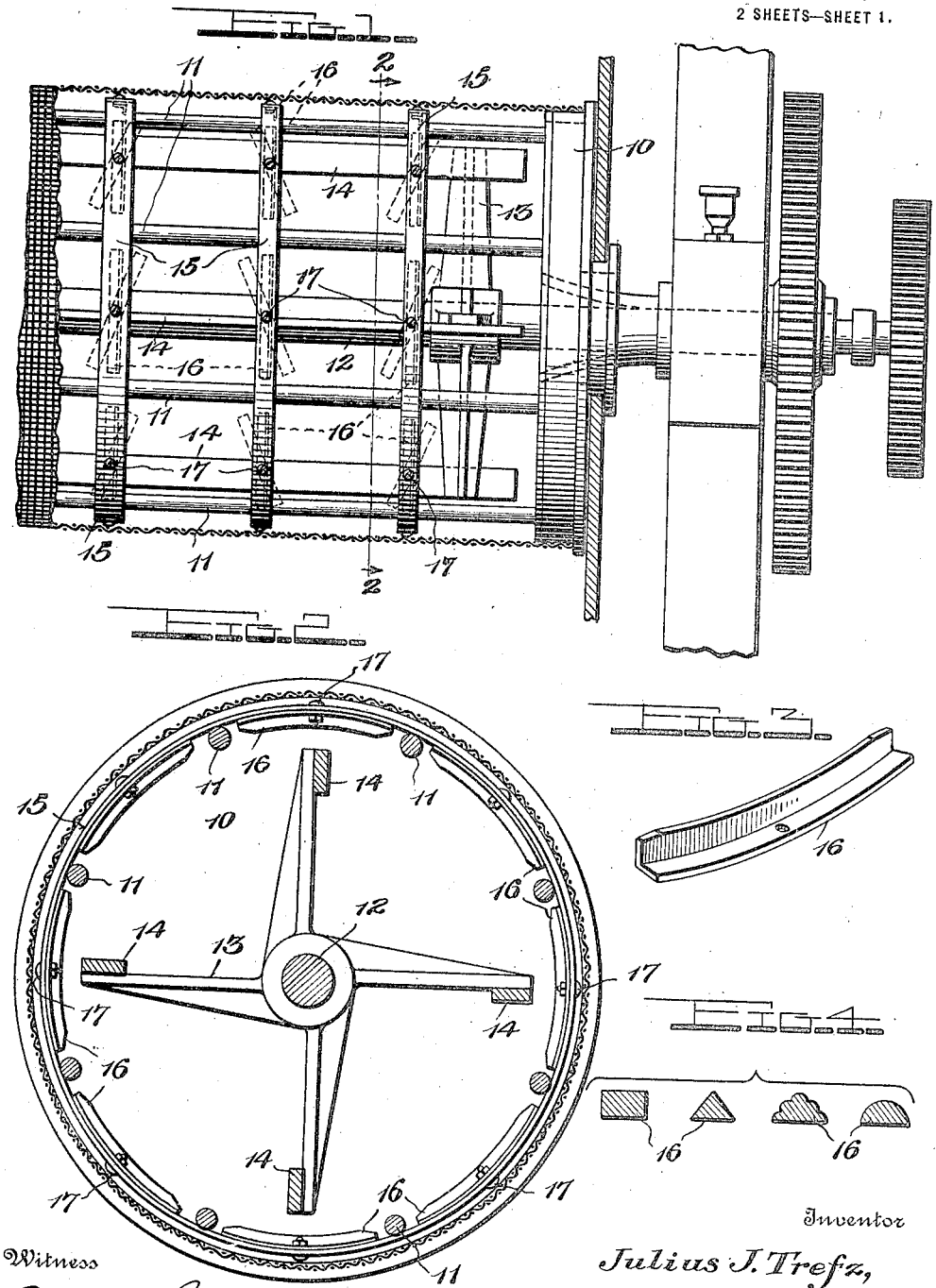
Witness
Chas. L. Griesbauer
Inventor
Julius J. Trefz,
By
Snyder, Cushman & Rea
Attorneys

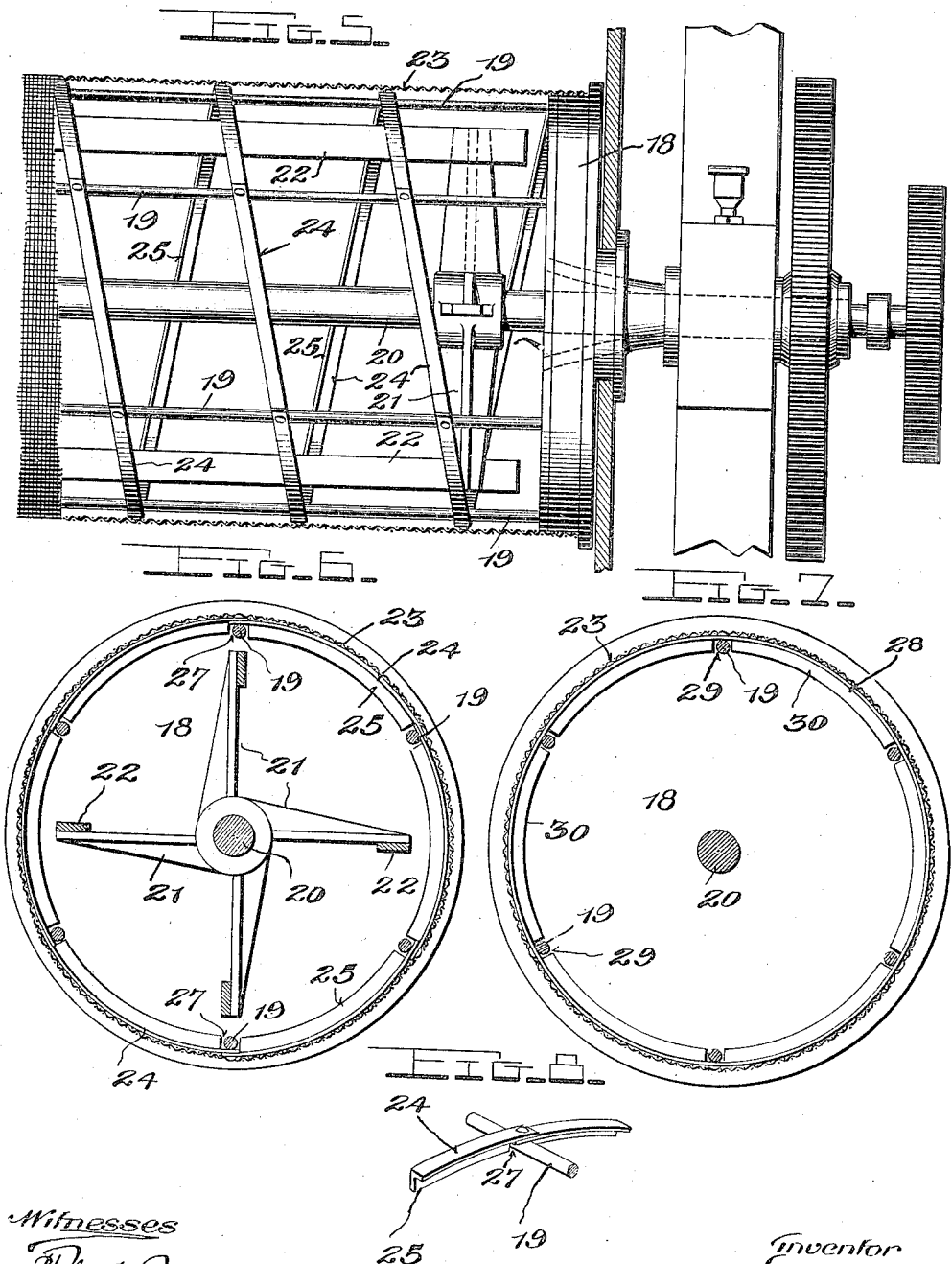

UNITED STATES PATENT OFFICE.

JULIUS J. TREFZ, OF OWENSBORO, KENTUCKY, ASSIGNOR TO THE ANGLO-AMERICAN MILL COMPANY, OF OWENSBORO, KENTUCKY, A CORPORATION OF KENTUCKY.

BOLTING-REEL.

1,302,456. Specification of Letters Patent. Patented Apr. 29, 1919.

Application filed November 3, 1916. Serial No. 129,288.

*To all whom it may concern:*

Be it known that I, JULIUS J. TREFZ, a citizen of the United States, residing at Owensboro, in the county of Daviess and State of Kentucky, have invented new and useful Improvements in Bolting-Reels, of which the following is a specification.

The present invention relates to flour mills, and has to do with the bolting reels or centrifugal dressers, as they are termed, the function of which is to bolt or dress out of the stock coming from the break section of the mill the throughs, which are delivered to any proper point, the coarser stock being tailed over by the reel, and either subjected to further treatment, or discharged from the mill.

More particularly the invention relates to means for disintegrating and feeding the stock through the reel, so that a reel of this type equipped with smooth beaters, as distinguished from stock feeding beaters, will be capable of causing the stock to traverse the reel from one end to the other. The means provided for effecting this travel of the stock may be adjustable, if desired, in order that the stock may be fed forward at different speeds, dependent on the needs of the work, or it may be shifted backward and forward in the reel if this is found desirable.

I accomplish this object by providing a deflector projecting inwardly of the reel, and it may be inclined so as to have a conveyer or screw action on the stock, and it will, furthermore, disintegrate and break up any massed or cohering particles of the stock. In one disclosure of my invention, this deflector takes the form of pivotally mounted blades which are angularly adjustable relative to the axis of the reel; while in another form, in which I have developed the invention, the deflector is a fixed spiral. The deflector blades are preferably mounted directly on the reel windings, for by doing this there need be no exterior structure to support the blades. Thus the blades may be used without materially increasing the weight of the reel or complicating its structure.

In the drawings herewith I have illustrated two embodiments of my invention, but it will be understood that this is merely illustrative and not in any sense restrictive, as the invention may be worked out by the use of other mechanical expedients.

In the drawings:—

Figure 1 is a view in side elevation of so much of a bolting reel frame of conventional type as will serve to illustrate my invention.

Fig. 2 is a transverse sectional view of the reel frame shown in Fig. 1.

Fig. 3 is a detail view of one of the deflector blades.

Fig. 4 is a view showing various cross-sections of deflector blades, which may be desirable.

Fig. 5 is a view in side elevation of so much of the reel as is necessary to show the fixed spiral type of deflector.

Fig. 6 is a cross-sectional view of a reel showing the manner of securing the deflector.

Fig. 7 is a cross-sectional view of the reel showing a slightly different method of forming the deflector.

Fig. 8 is a detail perspective view showing the manner of fastening the deflector to the reel rods.

Referring to the drawings by numbers, like numbers indicating like parts in the several views, 10 indicates a conventional reel head of not unusual construction, the said head 10 being coupled by circumferentially arranged reel rods 11 with a similar head (not shown) at the other end of the reel, this entire reel being mounted in any suitable bearings, and provided with driving means.

The beater shaft 12, as is usual, traverses this reel centrally, and is provided with blade supporting spiders 13, and the usual beater blades 14, conventionally shown.

Mounted upon the reel rods 11 at suitable intervals are reel windings 15 which may be of any of the various types, such as, for example, the annular type shown in Fig. 1, or the spiral type shown in Fig. 5; it being understood that the term "winding", as used in the art, refers to circumferentially disposed strips whether the specific arrangement is annular, spiral, or otherwise, of any suitable material, usually, metal, over which reel windings the bolting silk is stretched in the customary manner.

Mounted upon the reel winding 15, at points between the reel rods 11, are deflector blades 16, which blades are curved to conform to the curvature of the reel winding, and are secured thereto in any suitable manner, as by the bolts 17. The deflectors may be of any desired shape in cross-section, and in Figs. 1 and 2 are shown in the form of angle irons, although they may take any of the forms shown in Fig. 4, or in fact shaped in cross-section, as may be found desirable. When the deflectors 16 are arranged preferably, in circumferential series parallel with the reel winding, and in a plane at right angles to the axis of the reel, they will, of course, have no feeding action on the stock, but will to a considerable extent coöperate with the beater blades in disintegrating the stock, having a harrowing action thereon. By turning these deflector blades on their pivots and locking them in a plane angular to the axis of rotation of the reel as shown at the right in Fig. 1, these deflectors will not only more thoroughly disintegrate the stock, but will also shift it longitudinally of the reel, and by varying the angle of these deflectors the rate of speed of the stock through the reel may be varied, the action being similar to the action of the ordinary flight conveyer or screw.

By setting the deflectors at constantly progressing angles on each reel winding a differential speed of travel may be given to the stock, and by increasing the angle of deflection of the blades on the succeeding reel windings the speed of travel of the stock may be increased from one end of the reel to the other. Again, by reversing the angular position of these deflectors on the succeeding reel windings, as indicated in Fig. 1, the stock may be shifted back and forth between the succeeding sets of deflectors, so that it will be thoroughly agitated and held under treatment in the reel until the throughs are very completely extracted. Further, by mounting the deflector blades directly on the reel windings a desirable simplicity and lightness of reel construction is obtained, for the reel rods 11 do not have to be of flat shape, thus permitting the use of small round rods which are found to be of amply sufficient strength to give the necessary rigidity to the structure.

In that form of the invention developed in Figs. 5 to 8, inclusive, 18 indicates a conventional reel head of any usual construction, said head 18 being coupled by a series of circumferentially arranged reel rods 19 with a similar head (not shown) at the other end of the reel, this reel being mounted in any suitable bearings provided and with suitable driving means.

The beater shaft 20, together with the blade supporting spiders 21, and the beater blades 22 may be of any usual or desired construction.

Arranged spirally about the rods 19, and between the rods and the usual bolting cloth 23, is a reel winding 24, and while the said reel winding is disclosed herein as a continuous spiral, it will be understood that it is within the range of my invention to provide a series of spiral sections which may be separated from one another as distinguished from a complete spiral from end to end of the reel.

The said reel winding has an inwardly projecting portion 25, which may be conveniently formed by making the reel winding of angle iron substantially of L-shape, or such other shape as may be desirable, so as to prevent a deflector which will engage the stock in the reel, and by reason of the spiral disposition of the reel winding will effect a traverse of the stock in the reel from the receiving to the delivery end, thoroughly breaking up the stock, and so agitating it to secure a maximum amount of "throughs," and effectively pass the stock along the reel.

The said reel winding 24, as stated, may be conveniently, although not necessarily, made of angle iron L-shaped in cross-section, although any type of winding which will give the inwardly projecting deflector rib may be utilized, and in Fig. 6, I have illustrated a convenient manner of assembling and mounting the reel winding. In this construction the winding is made up of relatively short sections, which, as shown, are lapped at their ends upon the reel rods 19, and suitably secured thereto by riveting, or in any desired manner. It will be observed that in this construction the sections of the reel winding 25 have the deflector rib 26 cut back from the end of the section so that the ends of the adjacent sections may be lapped one upon the other as shown, and a seat or notch 27 provided to receive the reel rods 11.

Instead of this sectional construction of winding the reel winding may, as shown in Fig. 7, be formed of a single piece 28 if desired, in event of which notches 29 will be cut at regular intervals in the deflector rib 30 to receive the reel rods.

This spiral arrangement of the winding has the advantage not only of enabling me to secure an effective feeding means to carry the stock to the reel, but gives also a very rigid support for the reel rods and the bolting cloth.

Such changes from the constructions herein disclosed as are within the skill of the mechanic are to be taken, of course, as within the scope of my invention, and I do not limit myself, therefore, to the details herein shown and described, except in so far as I am limited by the terms of the appended claims.

I claim:—

1. A bolting reel comprising reel heads; spaced and axially disposed rods connecting said heads adjacent their edges, said rods being circumferentially arranged relative to the heads; reel windings on said rods; and deflector blades on the windings between each of said rods and extending radially toward the center of the reel, said blades being adapted to cause the stock to progress through the reel when the latter is rotated.

2. A bolting reel comprising reel heads; spaced and axially disposed rods connecting said heads adjacent their edges, said rods being circumferentially arranged relative to the heads; reel windings on said rods; and deflector blades on the windings between each of said rods and extending radially toward the center of the reel, said blades being pivotally and adjustably secured to said windings.

In testimony whereof I have hereunto set my hand in presence of two subscribing witnesses.

JULIUS J. TREFZ.

Witnesses:
L. FERMONE LITTLE,
C. T. HOWSON.

Copies of this patent may be obtained for five cents each, by addressing the "Commissioner of Patents, Washington, D. C."